May 15, 1934.  F. B. STEARNS  1,959,279
BEARING
Filed Oct. 11, 1932   2 Sheets-Sheet 1
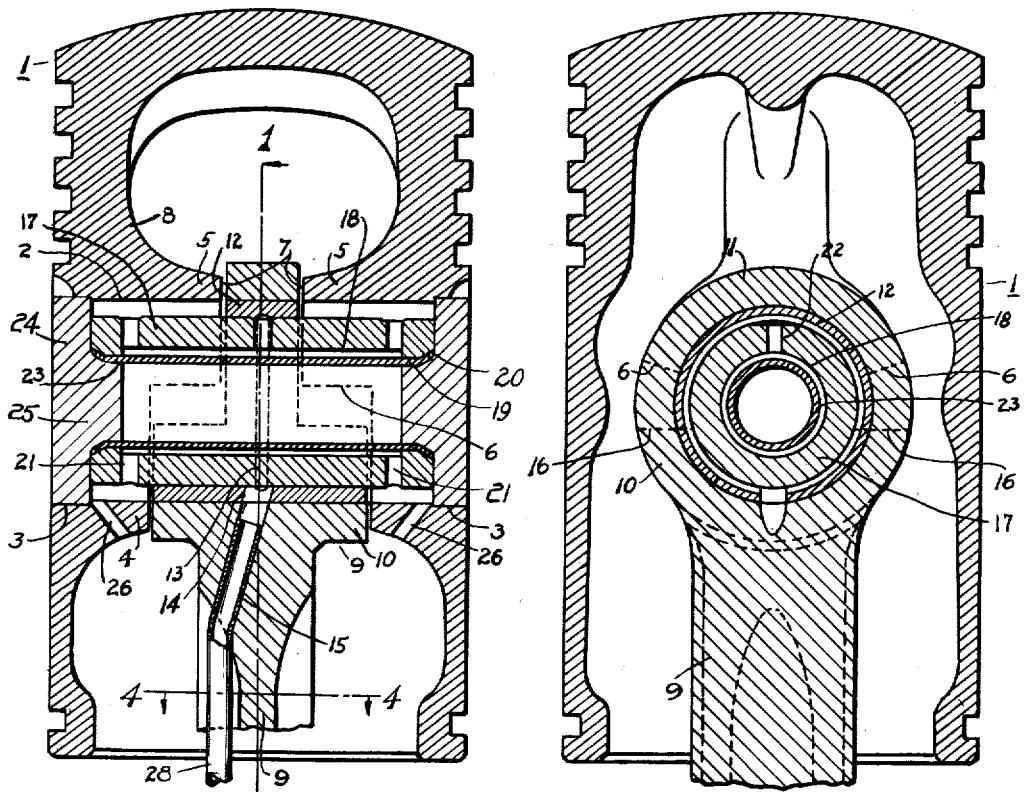
Fig.1.
Fig.2.
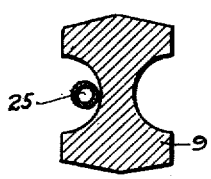
Fig.4.
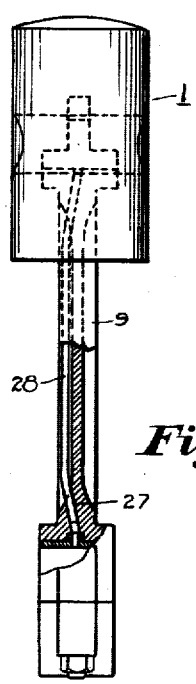
Fig.3.
INVENTOR.
FRANK BALLOU STEARNS
BY Stough and Canfield
HIS ATTORNEYS May 15, 1934.  F. B. STEARNS  1,959,279
BEARING
Filed Oct. 11, 1932   2 Sheets-Sheet 2

INVENTOR.
FRANK BALLOU STEARNS
BY Slough and Canfield
His ATTORNEYS

Patented May 15, 1934

1,959,279

UNITED STATES PATENT OFFICE 1,959,279

BEARING

Frank Ballou Stearns, Shaker Heights, Ohio

Application October 11, 1932, Serial No. 637,273

13 Claims. (Cl. 309—19)

This invention relates to bearings and more particularly to piston, connecting rod, and wrist pin bearings.

In internal combustion engines and particularly engines of the Diesel type wherein cylinder and piston pressures up to 1500 lbs. per square inch may be developed and relatively high temperatures encountered it is essential that the wrist pin bearing be kept well lubricated and be adapted to radiate the frictional heat generated.

However, difficulty has been encountered in accomplishing this and still retaining the necessary area of contact between the wrist pin and bearing demanded by the thrust transmitted from the piston to the connecting rod.

My invention is designed to obviate this difficulty by providing a connecting rod bearing having a large area supporting the under side of the wrist pin and a relatively small area of contact at the upper portion of the wrist pin. The large area takes the downward thrust of the piston on the compressive or working stroke and the relatively small upper area of the bearing takes the relatively decreased thrust due mainly to the mass of the piston as it moves upwardly in the cylinder.

It is an object of my invention therefore to provide an improved wrist pin and bearing connection wherein a substantial area of the wrist pin is not in contact with the bearing thereby facilitating lubrication and dissipation of heat generated by friction.

Another object of my invention is to provide a wrist pin and bearing connection wherein a substantial area of the wrist pin is adapted to dissipate frictional heat.

Another object of my invention is to provide a wrist pin and bearing connection wherein the thrusts are confined to relatively well lubricated areas.

Another object of my invention is to provide a wrist pin and bearing connection having an improved means of lubricating the same.

Another object of my invention is to provide a wrist pin and bearing connection comprising elements requiring the minimum of machine operations.

Another object of my invention is to provide a wrist pin and bearing connection which can be easily and efficiently assembled.

Another object of my invention is to provide a wrist pin and bearing connection having improved conducting lubricant passages.

Another object of my invention is to provide an improved means of lubricating a wrist pin and bearing connection by forced lubrication from the crank end bearing of a connecting rod.

These and other objects will become more apparent from a consideration of the following specification and from the accompanying drawings in which like reference numbers indicate like parts, and in which:

Fig. 1 is a medial sectional view of a piston and connecting rod provided with bearings embodying my invention taken longitudinally of the bearings;

Fig. 2 is a transverse medial sectional view taken along the line 1—1 of Fig. 1;

Fig. 3 is an elevational partly sectional view of a connecting rod, wrist pin and piston embodying my invention and drawn to a smaller scale than the piston of Figs. 1 and 2;

Fig. 4 is a cross-sectional view taken from the plane 4 of Fig. 1;

Figures 5, 6:
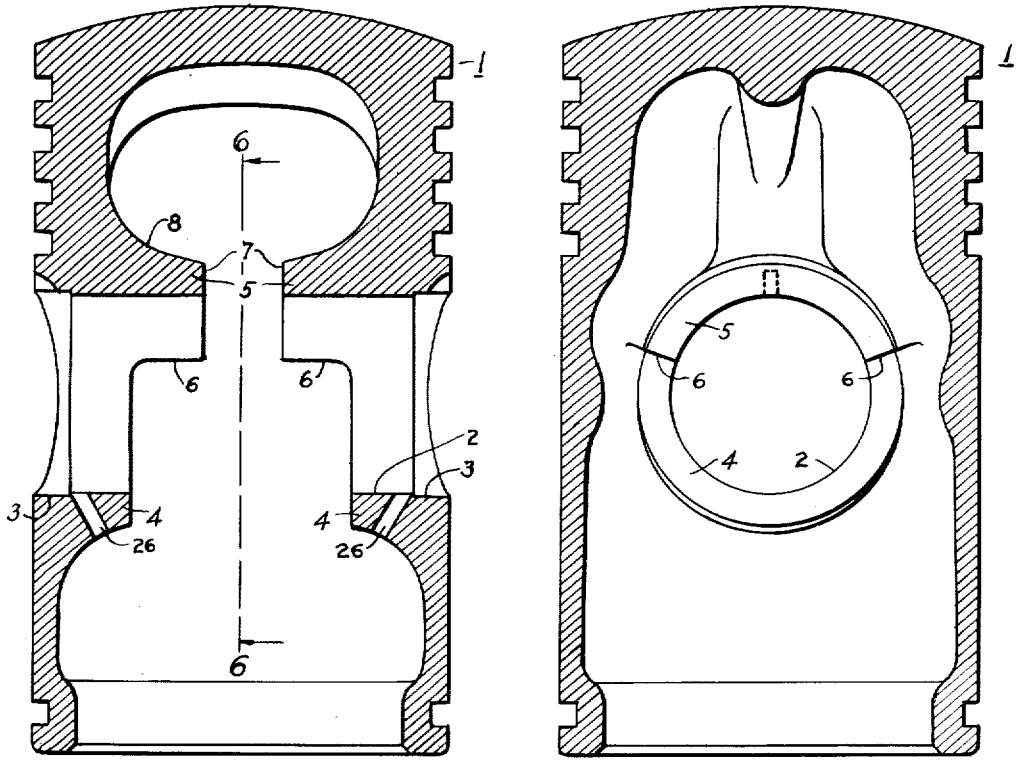
Fig. 5 is a longitudinal sectional view of a piston similar to Fig. 1 but with parts thereof omitted.
Fig. 6 is a view taken from the plane 6—6 of Fig. 5.
Figure 7:
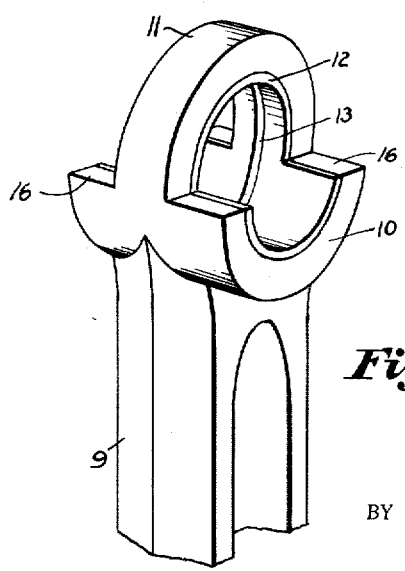
Fig. 7 is a perspective view of the piston end of a connecting rod embodying my invention.

Referring to the drawings, I show at 1, a generally cup form hollow piston provided with transverse coaxial bores 2 terminating in slightly enlarged coaxial bores 3 at the piston walls and providing a slight preferably right-angled shoulder therebetween. The bores 2 and 3 are formed in bosses 4 projecting transversely inwardly from the interior of the piston walls and generally centrally positioned relative to the top and bottom of the piston.

An upper arcuate flanged portion or segment 5 of each boss 4 extends inwardly a substantial distance beyond the general face of the boss and is preferably equally disposed on either side of the longitudinal axis of the piston, with the downwardly projecting faces 6 thereof terminating in radial planes through the boss axis and making preferably equal angles with and above the horizontal center line of the boss to form segments substantially less than a semi-circle as indicated in Fig. 6. The vertical faces 7 of the arcuate portion 5 are preferably machined so as to be equally and accurately disposed relative to the longitudinal axis of the piston.

An upwardly flaring integral rib 8 is preferably disposed above the flange 5 to provide additional support at this point.

The wrist pin bearing end of the connecting rod generally indicated at 9 comprises a wrist pin bore within an integral transverse arcuate flange 10 preferably symmetrically disposed relative to the longitudinal axis of the rod and an integral relatively narrow annular band 11 extending axially upwardly therefrom. The flange 10 and band 11 or the bore therein are lined with a suitable bearing material 12 which is provided with an annular oil groove 13 which joins aligned apertures 14 and 15 provided in the bearing material 12 and the flange portion 10 respectively. The upwardly projecting faces 16 of the flange 10 are preferably disposed in a horizontal plane and below the bore axis to ensure that sufficient clearance will be provided between the faces 6 of the piston and the faces 16 of the connecting rod as the rod is relatively rocked due to its well known reciprocating motion when in use.

A tubular wrist pin 17 which is centrally positioned or telescoped in the bore within the flange 10 and band 11 is provided with a central bore 18, having slightly reduced diameter bores 19 at each end thereof preferably outwardly flared at to their termini as indicated at 20. Oil ports 21 are provided adjacent each end of wrist pin 17 and a central oil port 22 is aligned with oil groove 13 in bearing 9. The outer face of the wrist pin is preferably flatted adjacent the said ports 23 to ensure that lubricant will flow readily thereto. A relatively thin walled tubular liner 23 preferably formed of copper is inserted within the wrist pin 17 and bears upon the inner walls of the bores 19 thereof and is secured therein by being outwardly flared to contact the flared portions 20.

An annular plug 24 provided with an annular co-axial inwardly extending boss 25 is press-fitted into the bore 3 provided therefor and abuts a shoulder on the piston at the inner face of the plug. The boss 25 tightly engages the flared portion 20 of the liner 23 and thereby supports the liner 23 and wrist pin 17 in non-rotative relationship and rigidly secure the pin to the piston. The skirt of the piston with the assembled plugs is then preferably ground to ensure a smooth joint therebetween and obviate any danger of scoring the cylinder.

The assembly is preferably performed in the sequence indicated and it is understood that the necessary machining and finishing operations of the various units will be completed before assembly. The wrist pin 17 is preferably hardened and ground to a running fit with bearing 9.

The bearing is adapted to be supplied with lubricant from a forced lubrication system of the engine on which it is used through the crank shaft bearing of the connecting rod. For this purpose an aperture 27 is provided in the crank shaft end of the connecting rod and adapted to have sealingly inserted therein a tube 28, the other end of which is sealingly disposed in aperture 15 of the wrist pin bearing. It will thus be seen that in lubricating the wrist pin bearing, lubricant under pressure, forced to the crank shaft bearing of the connecting rod in a manner well known in the art, may flow thence through the tube 28 to the oil groove 13 in the bearing 9. It will then flow through the port 22 in the wrist pin 17 and to the reservoir formed between the bore 18 of the wrist pin and the outer wall of liner 23, thence through the upper and lower ports 21 to a partial outer reservoir formed by the outer wall of the wrist pin, and the bores of the bosses 4 and the flanges 5. It will then flow through the apertures 26 provided in the bosses 4 into the interior of the piston and drops to a sump reservoir provided in the engine base.

By the construction above described, a stream of oil may flow freely through the wrist pin bearing; and the bearing surfaces are substantially immersed in an oil-filled reservoir; and the areas of the bearing surfaces are proportioned to their respective loads.

Although I have shown and described the embodiments of my invention, I contemplate that numerous and extensive departures may be made therefrom without departing from the spirit and scope of the invention and the appended claims.

I claim:

1. In a bearing construction of the class described, in combination, a connecting rod provided with a transverse pin bearing bore, a wrist pin in the bore, a piston having inwardly extending opposite coaxially bored bosses, the pin having axially oppositely recessed end portions of smaller outer diameter than the boss bores and projected thereinto and secured to the piston by plug elements pressed into the recessed end portions of the pin and into the boss bores.

2. In a bearing construction of the class described, in combination, a connecting rod provided with a transverse pin bearing bore, a wrist pin in the bore, a piston having inwardly extending opposite coaxially bored bosses, the pin being generally cylindrical, and of smaller outer diameter than the boss bores, and axially bored, and secured by opposite end portions to the cylinder by plug elements having each a central portion projected into the pin bore ends and flange portions pressed into the boss bores.

3. In a bearing construction of the class described, in combination, a connecting rod provided with a pin bearing bore, a wrist pin in the bore, the pin being of hollow cylindrical form with opposite end portions of reduced internal diameter, a sleeve lining the pin, fitted within the reduced diameter portions, and intermediately spaced from the pin bore, a piston having internally extending opposite coaxially bored bosses of larger diameter than the pin, the pin being secured to the cylinder coaxially of the boss bores by plug elements having reduced portions pressed into the sleeve ends and flange portions pressed into the boss bores.

4. In combination, a piston, connecting rod and wrist pin, the piston having inwardly extending opposite coaxially bored bosses, a generally cylindrical wrist pin disposed coaxially of the boss bores, the pin being of hollow cylindrical form with opposite end portions of reduced internal diameter, a sleeve lining the pin fitted into the reduced diameter portions, and intermediately spaced from the pin bore, the pin being secured to the piston coaxially of the boss bores by plug elements having reduced portions pressed into the sleeve ends and flange portions pressed into the boss bores, the pin being of smaller outside diameter than the boss bores and end portions thereof radially spaced from the boss bore wall, the connecting rod having a transverse pin bearing bore therein telescopically surrounding the pin and step formed to provide a part-cylindrical relatively long bearing bore surface upon that side of the bearing bore transmitting power thrust from the piston and pin to the rod, and a part-cylindrical relatively short bearing bore surface upon the opposite side of the bearing bore, an oil duct extending longitudinally through the rod and communicating with a generally circular groove in the wall of the pin bore, a generally radially extending duct in the pin wall communicating with the said groove and with the space between the sleeve and the pin bore, another duct extending outwardly through the pin wall from the said space, and a duct leading from the space between the pin and the boss bore wall to the piston interior.

5. In combination, a piston, connecting rod and wrist pin, the piston having inwardly extending opposite coaxially bored bosses, a generally cylindrical wrist pin disposed coaxially of the boss bores, the pin being of bored cylindrical form with opposite end portions of reduced internal diameter terminating in outwardly flaring frustoconical bore portions, a sleeve lining the pin fitting the reduced diameter portions, and the frusto-conical portions and intermediately spaced from the pin bore, the pin being secured to the cylinder coaxially of the boss bores by plug elements having reduced frusto-conical portions pressed into the sleeve ends and cylindrical flange portions pressed into the boss bores, the pin being of smaller outside diameter than the boss bores and end portions thereof radially spaced from the boss bore wall, a connecting rod having the transverse pin bearing bore therein telescopically surrounding the pin and step formed to provide a part-cylindrical relatively long bearing bore surface upon that side of the bearing bore transmitting power thrust from the piston and pin to the rod, and a part-cylindrical relatively short bearing bore surface upon the opposite side of the bearing bore, an oil duct extending longitudinally through the rod and communicating with a generally circular groove in the wall of the pin bore, a generally radially extending duct in the pin wall communicating with the said groove and with the space between the sleeve and the pin bore, another duct extending outwardly through the pin wall from the said space, a duct leading from the space between the pin and the boss bore wall to the piston interior.

6. In a wrist pin bearing construction, in combination, a generally cup form piston provided with bores in opposite wall portions thereof, plug elements fitted into and rigidly engaging the walls of the bores to restrain the plug elements from axial and radial shifting and the plug elements having confronting portions of reduced diameter, and a wrist pin having hollow opposite end portions fitted over the reduced diameter portions of the plugs and rigidly connected to the piston through the plug elements.

7. A wrist pin bearing construction as described in claim 6 and in which the inner piston wall is provided with opposite inwardly extending bosses and the piston wall bores are formed therein and the bores are larger than the opposite outer end portions of the pin leaving spaces between the opposite end portions of the pin and the bore walls.

8. In a wrist pin bearing construction, in combination, a generally cup form piston, a generally tubular wrist pin rigidly secured at opposite end portions to opposite wall portions of the piston, means in the pin providing a chamber of tube form on the tubular pin inner wall, a first duct means extending from the said chamber through the pin wall, a connecting rod having a wrist pin bearing bore in one end thereof telescoped on the pin and adapted to oscillate thereon in operation of the piston and connecting rod, a second duct means extending longitudinally of the rod adapted to be connected to a source of lubricant under pressure, a third duct means in the connecting rod pin bore surface communicating with the second duct means and communicating with the first duct means in all operative oscillated positions of the rod and pin to continuously supply lubricant from the connecting rod duct means to the chamber, and lubricant conduit means for conducting lubricant from the chamber to the outer wall of the wrist pin and thence to the piston interior to provide a continuously open passageway through which lubricant under pressure may freely flow through the second, third and first duct means and to the chamber and thence by the lubricant conduit means to the piston interior and whereby lubricant in the second duct means may lubricate the wrist pin bearing bore.

9. In a wrist pin bearing construction, in combination, a generally cup form piston having inwardly extending opposite bosses, a generally tubular wrist pin rigidly secured at opposite end portions in the bosses, means in the pin providing a chamber of tube form on the tubular pin inner wall, a first duct means extending from the said chamber through the pin wall, a connecting rod having a wrist pin bearing bore in one end thereof telescoped on the pin and adapted to oscillate thereon in operation of the piston and connecting rod and centered on the pin by and between the boss inner ends, a second duct means extending longitudinally of the rod adapted to be connected to a source of lubricant under pressure, a third duct means in the connecting rod pin bore surface communicating with the second duct means and communicating with the first duct means in all operative oscillated positions of the rod and pin to continuously supply lubricant from the second duct means to the chamber, and a fourth duct means extending from the chamber through the pin wall at a point adjacent a boss inner end to conduct lubricant from the chamber to the centering engagement of the connecting rod and boss and thence to the piston interior.

10. In a wrist pin bearing construction, in combination, a generally cup form piston, bosses extending inwardly from portions of the piston inner wall, axially aligned bores in the bosses, a generally tubular wrist pin having end portions externally smaller than the boss bores, means for rigidly connecting the pin ends to the cylinder wall, and with spaces between the inner boss bore surfaces and end portions of the pin, means in the pin providing a chamber of tube form on the tubular pin inner wall, a first duct means extending from the said chamber through the pin wall, a connecting rod having a wrist pin bearing bore in one end thereof telescoped on the pin and adapted to oscillate thereon in operation of the piston and connecting rod, a second duct means extending longitudinally of the rod adapted to be connected to a source of lubricant under pressure, a third duct means in the connecting rod pin bore surface communicating with the second duct means and communicating with the first duct means in all operative oscillated positions of the rod and pin, to continuously supply lubricant from the second duct means to the chamber, and a fourth duct means extending from the chamber through the pin wall to supply lubricant from the chamber to one of the said spaces and means for conducting lubricant from the supplied space to the connecting rod bearing bore.

11. A wrist pin bearing construction as described in claim 10 and in which the connecting rod end is centered by and between the inner ends of the bosses and the fourth duct means extending from the chamber through the pin wall supplies lubricant from the chamber to both of said spaces and to points adjacent the centering engagement of the connecting rod and bosses to lubricate the same.

12. A wrist pin bearing construction as described in claim 10 and in which a fifth duct means is provided leading from at least one of the said spaces to the interior of the piston.

13. In a wrist pin bearing construction, in combination, a generally cup form piston, a wrist pin rigidly secured at opposite end portions to opposite wall portions of the piston, means providing a chamber in the pin, a first duct means extending from the chamber outwardly through the pin, a connecting rod having a wrist pin bearing bore in one end thereof telescoped on the pin and adapted to oscillate thereon in operation of the piston and connecting rod, a second duct means extending longitudinally of the rod adapted to be connected to a source of lubricant under pressure, a third duct means in the connecting rod pin bore surface communicating with the second duct means and communicating with the first duct means in all operative oscillated positions of the rod and pin to continuously supply lubricant from the connecting rod duct means to the chamber, and lubricant conducting means from the chamber to the piston interior.

FRANK BALLOU STEARNS.

CERTIFICATE OF CORRECTION.

Patent No. 1,959,279.　　　　　　　　　　　　　　　　May 15, 1934.

FRANK BALLOU STEARNS.

It is hereby certified that error appears in the printed specification of the above numbered patent requiring correction as follows: Page 2, line 23, strike out the word "to"; line 27, for "23" read 22; and line 75, after "sump" insert or; page 3, line 23, claim 5, for "a" read the; and for "the" second occurrence read a; and that the said Letters Patent should be read with these corrections therein that the same may conform to the record of the case in the Patent Office.

Signed and sealed this 7th day of August, A. D. 1934

Leslie Frazer (Seal)　　　　　　　　　　　　　　　　Acting Commissioner of Patents.

gagement of the connecting rod and bosses to lubricate the same.

12. A wrist pin bearing construction as described in claim 10 and in which a fifth duct means is provided leading from at least one of the said spaces to the interior of the piston.

13. In a wrist pin bearing construction, in combination, a generally cup form piston, a wrist pin rigidly secured at opposite end portions to opposite wall portions of the piston, means providing a chamber in the pin, a first duct means extending from the chamber outwardly through the pin, a connecting rod having a wrist pin bearing bore in one end thereof telescoped on the pin and adapted to oscillate thereon in operation of the piston and connecting rod, a second duct means extending longitudinally of the rod adapted to be connected to a source of lubricant under pressure, a third duct means in the connecting rod pin bore surface communicating with the second duct means and communicating with the first duct means in all operative oscillated positions of the rod and pin to continuously supply lubricant from the connecting rod duct means to the chamber, and lubricant conducting means from the chamber to the piston interior.

FRANK BALLOU STEARNS.

CERTIFICATE OF CORRECTION.

Patent No. 1,959,279.                             May 15, 1934.

FRANK BALLOU STEARNS.

It is hereby certified that error appears in the printed specification of the above numbered patent requiring correction as follows: Page 2, line 23, strike out the word "to"; line 27, for "23" read 22; and line 75, after "sump" insert or; page 3, line 23, claim 5, for "a" read the; and for "the" second occurrence read a; and that the said Letters Patent should be read with these corrections therein that the same may conform to the record of the case in the Patent Office.

Signed and sealed this 7th day of August, A. D. 1934

Leslie Frazer (Seal)                                    Acting Commissioner of Patents.